United States Patent
Saito et al.

(10) Patent No.: US 11,333,265 B2
(45) Date of Patent: May 17, 2022

(54) ELECTROMAGNETIC VALVE

(71) Applicants: DAIDO STEEL CO., LTD., Nagoya (JP); DENSO CORPORATION, Kariya (JP)

(72) Inventors: Akihiko Saito, Nagoya (JP); Takeshi Takano, Nagoya (JP); Yu Nakama, Nagoya (JP); Satoshi Doi, Kariya (JP); Takeshi Senoo, Kariya (JP); Tetsuya Aoki, Kariya (JP); Masatsune Ozawa, Kariya (JP); Makoto Saizen, Kariya (JP)

(73) Assignees: DAIDO STEEL CO., LTD., Nagoya (JP); DENSO CORPORATION, Aichi (JP)

( * ) Notice: Subject to any disclaimer, the term of this patent is extended or adjusted under 35 U.S.C. 154(b) by 199 days.

(21) Appl. No.: 16/765,386

(22) PCT Filed: Aug. 30, 2018

(86) PCT No.: PCT/JP2018/032250
§ 371 (c)(1),
(2) Date: May 19, 2020

(87) PCT Pub. No.: WO2019/123725
PCT Pub. Date: Jun. 27, 2019

(65) Prior Publication Data
US 2020/0340598 A1  Oct. 29, 2020

(30) Foreign Application Priority Data

Dec. 22, 2017  (JP) .............................. JP2017-245999

(51) Int. Cl.
*F16K 31/06* (2006.01)
*F02M 51/06* (2006.01)
(Continued)

(52) U.S. Cl.
CPC .......... *F16K 31/0675* (2013.01); *C22C 38/06* (2013.01); *C22C 38/44* (2013.01);
(Continued)

(58) Field of Classification Search
CPC ..... F16K 31/0675; C22C 38/06; C22C 38/44; C22C 38/60; F02M 51/061;
(Continued)

(56) References Cited

U.S. PATENT DOCUMENTS 4,714,502 A * 12/1987 Honkura .................. C22C 38/60
148/307
5,865,907 A *  2/1999 Katayama ............... F16K 31/06
148/120

(Continued)

FOREIGN PATENT DOCUMENTS

CN         1424422 A      6/2003
CN       101876035 A     11/2010
(Continued)

OTHER PUBLICATIONS

International Search Report (ISR) (PCT Form PCT/ISA/210), in PCT/JP2018/032250, dated Nov. 27, 2018, and English Translation thereof.

(Continued)

*Primary Examiner* — John Bastianelli
(74) *Attorney, Agent, or Firm* — McGinn IP Law Group, PLLC

(57) ABSTRACT

An electromagnetic valve used in a fuel system, in which at least a portion of a member constituting an magnetic circuit in an electromagnetic drive unit includes 0.15-0.45 mass % (inclusive) Ni, 0.65-1.0 mass % (inclusive) Al, 9.2-10.3 mass % (inclusive) Cr, and 0.90-1.6 mass % (inclusive) Mo, and the remainder comprises an alloy material comprising (Continued)

Fe and unavoidable impurities. The alloy material may further include 0.05-0.15 mass % (inclusive) Pb.

8 Claims, 2 Drawing Sheets

(51) Int. Cl.
| | | |
|---|---|---|
| *F02M 61/16* | (2006.01) | |
| *H01F 7/08* | (2006.01) | |
| *H01F 1/147* | (2006.01) | |
| *C22C 38/44* | (2006.01) | |
| *C22C 38/06* | (2006.01) | |
| *H01F 7/16* | (2006.01) | |
| *C22C 38/60* | (2006.01) | |

(52) U.S. Cl.
CPC ........... *C22C 38/60* (2013.01); *F02M 51/061* (2013.01); *F02M 51/0614* (2013.01); *F02M 61/161* (2013.01); *F02M 61/166* (2013.01); *H01F 1/14708* (2013.01); *H01F 7/081* (2013.01); *H01F 7/1607* (2013.01); *F02M 2200/08* (2013.01)

(58) Field of Classification Search
CPC ............. F02M 51/0614; F02M 61/161; F02M 61/166; F02M 2200/08; H01F 1/14708; H01F 7/081; H01F 7/1607
USPC ........................................ 251/129.15–129.22
See application file for complete search history.

(56) References Cited

U.S. PATENT DOCUMENTS

| | | | | |
|---|---|---|---|---|
| 6,143,094 | A * | 11/2000 | Sugiyama | C21D 7/02 148/120 |
| 6,380,832 | B2 * | 4/2002 | Oyama | F01L 3/02 335/281 |
| 6,722,627 | B2 * | 4/2004 | Murao | F16K 31/0613 251/129.07 |
| 6,755,360 | B1 * | 6/2004 | Anderson | F02M 51/0671 239/533.7 |
| 7,097,151 | B2 * | 8/2006 | Akabane | F02M 51/005 251/129.18 |
| 7,182,281 | B2 * | 2/2007 | Catasus-Servia | F02M 51/0682 239/453 |
| 7,474,026 | B2 * | 1/2009 | Okuda | F16K 31/0658 251/129.15 |
| 9,086,042 | B2 * | 7/2015 | Filippi | F02M 65/005 |
| 9,169,821 | B2 * | 10/2015 | McAlister | F02M 57/06 |
| 10,593,451 | B2 * | 3/2020 | Masumoto | C21D 6/004 |
| 10,626,834 | B2 * | 4/2020 | Liu | C23C 28/322 |
| 2003/0086810 | A1 * | 5/2003 | Schnabel | C22C 38/42 420/67 |
| 2003/0121575 | A1 | 7/2003 | Bourgin et al. | |
| 2003/0192626 | A1 * | 10/2003 | Takiguchi | C22C 38/50 148/405 |
| 2009/0184790 | A1 * | 7/2009 | Pieper | C22C 1/02 335/297 |
| 2010/0102910 | A1 * | 4/2010 | Waeckerle | C22C 38/02 335/297 |
| 2018/0363612 | A1 * | 12/2018 | Okamoto | H01F 7/081 |

FOREIGN PATENT DOCUMENTS

| | | |
|---|---|---|
| CN | 103205548 A | 7/2013 |
| JP | H01-290749 A | 11/1989 |
| JP | H06-280048 A | 10/1994 |
| JP | H09-194938 A | 7/1997 |
| JP | H11-279717 A | 10/1999 |
| JP | 2000-313944 A | 11/2000 |
| JP | 2006-009044 A | 1/2006 |

OTHER PUBLICATIONS

Written Opinion of the International Search Authority (PCT Form PCT/ISA/237) PCT/JP2018/032250, dated Nov. 27, 2018.
Chinese Office Action, dated May 31, 2021, in Chinese Application No. 201880081821.9 and English Translation thereof.

* cited by examiner

[FIG. 1]
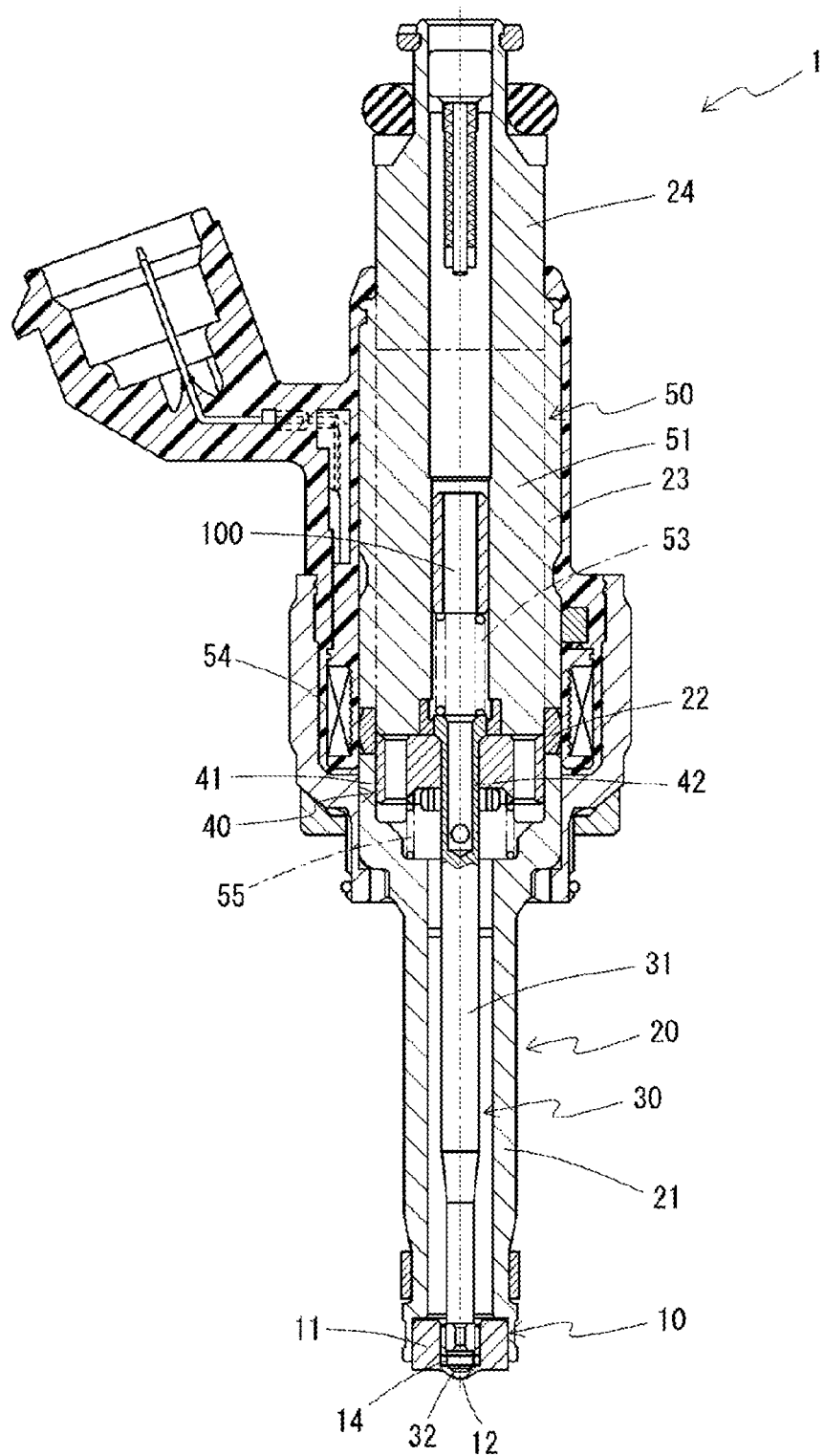

[FIG. 2]
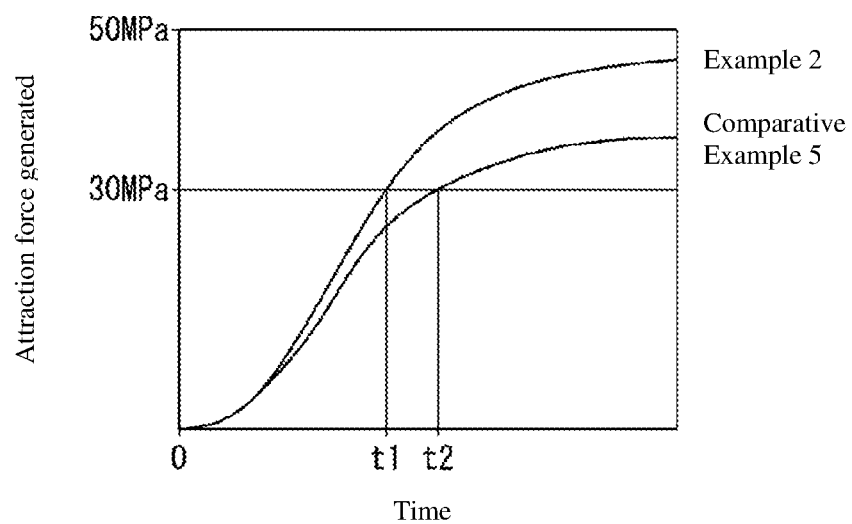

ELECTROMAGNETIC VALVE

TECHNICAL FIELD

The present invention relates to an electromagnetic valve, more particularly to an electromagnetic valve used in a fuel system in which a member constituting a magnetic circuit is made of a soft magnetic material in an electromagnetic drive unit.

BACKGROUND ART

An electromagnetically driven fuel injection valve is used for injecting fuel into a combustion chamber of a gasoline engine. In an electromagnetic drive unit of this kind of fuel injection valve, electromagnetic stainless steel exhibiting high corrosion resistance and soft magnetism has been widely used as a material used for a member constituting a magnetic circuit, such as a core or a housing. A fuel injection valve using such electromagnetic stainless steel is disclosed in, for example, Patent Literature 1.

CITATION LIST

Patent Literature

Patent Literature 1: JP-A-H01-290749

SUMMARY OF INVENTION

Technical Problem

In recent years, in the fuel injection valve of a gasoline engine, high pressure injection or multistage injection is being advanced in view of reduction in a $CO_2$ emission amount, energy saving, improvement in fuel consumption, and the like. In order to achieve high pressure injection in the electromagnetic valve, a high magnetic flux density is required in the material constituting the magnetic circuit. In order to perform high pressure injection, a large magnetic attraction force is necessary to control opening and closing of the electromagnetic valve. As the material constituting the magnetic circuit has high saturation magnetic flux density, it is possible to follow operation of the electromagnetic drive unit in a high magnetic field and generate a large magnetic attraction force. In order to efficiently perform multistage injection, high responsiveness is required for the electromagnetic drive unit. As the material constituting the magnetic circuit has high electrical resistance, the responsiveness of the electromagnetic drive unit can be improved. In this way, the material constituting the magnetic circuit of the electromagnetic valve used in a fuel system is required to have high saturation magnetic flux density and electrical resistance in addition to high corrosion resistance.

It is desired that the saturation magnetic flux density has a high value of, for example, 1.8 T or higher. However, it is difficult to achieve such a high saturation magnetic flux density by using such a conventional electromagnetic stainless steel as disclosed in Patent Literature 1.

A problem to be solved by the present invention is to provide an electromagnetic valve used in a fuel system where a magnetic circuit made of an alloy material having excellent corrosion resistance, high saturation magnetic flux density, and high electrical resistance is provided in an electromagnetic drive unit.

Solution to Problem

In order to solve the above problem, the electromagnetic valve according to the present invention is an electromagnetic valve used in a fuel system, containing a member constituting a magnetic circuit in an electromagnetic drive unit, in which at least a part of the member is made of an alloy material containing, in mass %, $0.15\% \leq Ni \leq 0.45\%$, $0.65\% \leq Al \leq 1.0\%$, $9.2\% \leq Cr \leq 10.3\%$, and $0.90\% \leq Mo \leq 1.6\%$ with the balance being Fe and inevitable impurities.

Here, the electromagnetic valve is preferably a fuel injection valve.

The alloy material preferably further contains $0.05\% \leq Pb \leq 0.15\%$ in mass %.

The alloy material preferably has a structure of an $\alpha$ phase single phase.

Advantageous Effects of Invention

In the electromagnetic valve of the present invention, a magnetic circuit of an electromagnetic drive unit is made of an alloy material having a component composition as described above. The alloy material has high saturation magnetic flux density and electrical resistance in addition to high corrosion resistance owing to an effect of the component composition. As a result, in the electromagnetic valve, high pressure injection owing to a high magnetic attraction force and multistage injection owing to improvement in responsiveness are facilitated.

Here, in the case where the electromagnetic valve is a fuel injection valve, effects of high corrosion resistance, high pressure injection owing to a high magnetic attraction force, and multistage injection owing to improvement in responsiveness can be particularly effectively utilized.

In the case where the alloy material further contains $0.05\% \leq Pb \leq 0.15\%$ in mass %, machinability of the alloy material is improved, and the member constituting the magnetic circuit is easily processed in the electromagnetic valve.

In the case where the structure of the alloy material is an $\alpha$ phase single phase, a low coercive force is secured and excellent soft magnetic characteristics are easily obtained in the alloy material. As a result, the responsiveness of the electromagnetic valve is easily improved.

BRIEF DESCRIPTION OF DRAWINGS

FIG. 1 It is a sectional view schematically illustrating a configuration of a fuel injection valve in an embodiment of the present invention.

FIG. 2 It is a graph showing results of magnetic field analysis.

DESCRIPTION OF EMBODIMENTS

The electromagnetic valve in an embodiment of the present invention is an electromagnetic valve used in a fuel system, and specific examples of the form of the electromagnetic valve include a fuel injection valve. Hereinafter, the fuel injection valve will be described in detail as an example of the electromagnetic valve in an embodiment of the present invention.

[Structure of Fuel Injection Valve]

The fuel injection valve (injector) in an embodiment of the present invention is driven by an electromagnetic drive unit, and injects fuel into a combustion chamber of an engine, particularly a gasoline engine. In the fuel injection valve in the present embodiment, at least part of various members constituting a magnetic circuit in the electromagnetic drive unit is made of a specific alloy material. A specific structure of the fuel injection valve is not particularly specified, and a structure of a fuel injection device disclosed in JP-A-2017-89425 can be exemplified as an ideal structure. Details of the structure can be referred to in the above patent publication, and the structure will be briefly described below.

FIG. 1 illustrates a schematic sectional structure of a fuel injection valve 1. FIG. 1 is the same as that described as FIG. 1 in JP-A-2017-89425.

The fuel injection valve 1 has a nozzle 10, a housing 20, a needle 30, a movable core 40, a fixed core 50, springs 53 and 55, a coil 54, and the like.

The nozzle 10 has a nozzle cylinder portion 11 and a nozzle bottom portion 12 that blocks one end of the nozzle cylinder portion 11. A plurality of nozzle holes are formed in the nozzle bottom portion 12, and an annular valve seat 14 is formed around the nozzle holes. The housing 20 has a first cylinder portion 21, a second cylinder portion 22, and a third cylinder portion 23, and they are connected to each other in this order. The first cylinder portion 21 and the third cylinder portion 23 are formed of a magnetic material, and the second cylinder portion 22 is formed of a nonmagnetic material. The first cylinder portion 21 is connected to the nozzle cylinder portion 11 on the tip side. An inlet portion 24 is connected to the third cylinder portion 23. A fuel passage 100 is provided inside the housing 20 and the nozzle cylinder portion 11. When fuel is supplied to the inlet portion 24, the fuel flows into the fuel passage 100.

The needle 30 is housed within the housing 20 so as to be capable of reciprocating along an axis of the housing 20 in the fuel passage 100. A seal portion 32 provided on a tip side of a needle body 31 of the needle 30 is separated from or abuts on the valve seat 14 of the nozzle 10, so that the nozzle holes provided in the nozzle bottom portion 12 is opened and closed.

The movable core 40 has a movable core body 41 made of a magnetic material, and is housed in the housing 20 in a state in which the needle body 31 is inserted into a shaft hole portion 42 provided in the movable core body 41. Like the needle 30, the movable core 20 is capable of reciprocating in the axis direction of the housing 20 in the fuel passage 100.

The fixed core 50 is provided on a side opposite to the valve seat 14 against the movable core 40 inside the housing 20. The fixed core body 51 is made of a magnetic material and is formed integrally with the third cylinder portion 23 and the inlet portion 24 of the housing 20.

The spring 53 can bias the needle 30 and the movable core 40 toward the valve seat 14. The spring 55 can bias the movable core 40 toward the fixed core 50 by a biasing force weaker than that of the spring 53. The coil 54 is provided radially outside the housing 20, and generates a magnetic force when energized.

When the coil 54 is energized and a magnetic force is generated, a magnetic circuit is formed in members made of a magnetic material, such as the fixed core body 51, the movable core body 41, the first cylinder portion 21, and the third cylinder portion 23. Accordingly, a magnetic attraction force is generated between the fixed core body 51 and the movable core body 41, and the movable core 40 is attracted toward the fixed core 50. At this time, the needle 30 moves in a valve-opening direction together with the movable core 40, the seal portion 32 is separated from the valve seat 41, and the valve opens. As a result, the nozzle holes provided in the nozzle bottom portion 12 are opened, and fuel is injected from the nozzle holes.

In the fuel injection valve 1, at least part of the members constituting the magnetic circuit when the coil 54 is energized is made of a specific alloy material described in detail below. It is preferable that all of the members constituting the magnetic circuit are made of the following specific alloy material, but a part of them may be made of another soft magnetic material. In particular, at least the first cylinder portion 21, the movable core body 41, and the third cylinder portion 23, the inlet portion 24, and the fixed core body 51 that are integrally formed with each other are preferably made of the following specific alloy material. It is more preferable that the following specific alloy material is applied to a fuel injection valve having the movable core 40 and the needle 30 which are relatively movable in which the movable core 40 collides with the needle 30 in a state in which the movable core 40 moves in a predetermined amount toward the valve-opening direction when the coil 54 is energized and the movable core 40 is attracted by the fixed core body 51. Furthermore, it is preferable that the following specific alloy material is applied to a fuel injection valve in which a plurality of the movable cores 40 and a plurality of the coils 54 are provided.

[Alloy Material Constituting Magnetic Circuit]

Next, a specific alloy material used in at least a part of the member constituting the magnetic circuit in the fuel injection valve 1 in the embodiment will be described.

The alloy material contains the following component elements in a unit of mass %, with the balance being Fe and inevitable impurities.

$0.15\% \leq Ni \leq 0.45\%$ $0.65\% \leq Al \leq 1.0\%$ $9.2\% \leq Cr \leq 10.3\%$ $0.90\% \leq Mo \leq 1.6\%$ The alloy material exhibits soft magnetic characteristics because of having the above-mentioned component composition. In particular, because of containing both Ni and Al within the above-mentioned range, a soft magnetic material having high saturation magnetic flux density is formed while maintaining the coercive force low.

The saturation magnetic flux density of the alloy material increases by adding Ni. However, if an addition amount of Ni is too large, the saturation magnetic flux density decreases in turn. By setting the content of Ni within the above-mentioned range, the saturation magnetic flux density of the alloy material can be effectively increased.

On the other hand, if only Ni is added to the alloy material, a crystal structure becomes $\alpha$ phase $+\gamma$ phase or a martensite phase, and the coercive force tends to increase. Therefore, by adding Al together with Ni, generation of the $\alpha$ phase single phase exhibiting soft magnetism is promoted to ensure a low coercive force, and excellent soft magnetic characteristics can be obtained. In the case where the alloy material has a low coercive force, responsiveness of the electromagnetic valve is easily improved. By setting the content of Al in the above-mentioned range, such an effect can be sufficiently obtained. The "$\alpha$ phase single phase" includes a state where a phase other than the $\alpha$ phase, such as the $\gamma$-phase is inevitably contained in a small amount. Generally, a state in which an occupation rate of the $\alpha$ phase is 95 volume % or more can be regarded as the "$\alpha$ phase single phase".

Cr and Mo have an effect of increasing the corrosion resistance and electrical resistance of the alloy material. The larger the contents of Cr and Mo are, the more excellent the effect of increasing the properties, particularly the corrosion resistance is. However, in the case where Cr and Mo are excessively contained, the saturation magnetic flux density of the alloy material decreases. Therefore, in view of achieving high corrosion resistance and high electrical resistance as well as achieving high saturation magnetic flux density, the contents of Cr and Mo are set within the above-mentioned ranges, respectively.

In particular, Mo exhibits a high effect in improving corrosion resistance and increasing high electrical resistance even in a small amount of addition as compared with Cr. Therefore, in view of avoiding a decrease in the saturation magnetic flux density due to excessive addition of Cr, not only Cr but also Mo is added in combination.

The alloy material may contain 0.05 mass %≤Pb≤0.15 mass % as an optional element as necessary in addition to Ni, Al, Cr, and Mo, which are essential additive elements.

Pb is an element capable of improving machinability of an alloy. in the case where Pb is added in a content of the above-mentioned range, the effect of improving machinability can be sufficiently obtained. Since the alloy material has high machinability, processing of various members constituting the magnetic circuit of the fuel injection valve 1 into a necessary shape becomes easy.

In the alloy material, inclusion of inevitable impurities is permitted in a range where the magnetic characteristics and the corrosion resistance are not impaired. Specific examples of the inevitable impurities include, in a unit of mass %, C≤0.015%, Mn≤0.3%, P≤0.03%, S≤0.02%, N≤0.06%, Cu≤0.3%, Co≤0.06%, and O≤0.01%.

The alloy material exhibits excellent soft magnetic characteristics because of having the component composition described above. For example, B30000, which is a value of the magnetic flux density measured in an external magnetic field H=30,000 A/m, can be controlled as 1.8 T or more (B30000≥1.8 T). Here, B30000 is a value that can be approximated to the saturation magnetic flux density in this kind of soft magnetic alloy. Furthermore, in the alloy material, it is easy to secure a low coercive force. For example, a low coercive force such as 1,000 A/m or less can be achieved.

In addition, the alloy material has high electrical resistance. For example, a high value of $\rho \geq 65$ $\mu\Omega \cdot cm$ can be achieved as an electrical resistivity $\rho$.

Furthermore, the alloy material has high corrosion resistance. The corrosion resistance of the alloy material is exhibited with respect to various corrosive substances, and it has high corrosion resistance to gasoline.

The alloy material can be produced by melting each component metal and appropriately rolling, forging, and the like, and can be formed into a predetermined shape as a member constituting the magnetic circuit of the fuel injection valve 1. A heat treatment such as magnetic annealing may be appropriately performed on the alloy material. As temperature during the magnetic annealing, 800 to 1,200° C. can be exemplified.

[Characteristics of Alloy Material and Operation of Fuel Injection Valve]

In the fuel injection valve 1, in the case where the members constituting the magnetic circuit, such as the movable core body 41 and the fixed core body 51 are formed of the alloy material having the specific component composition described above, excellent operation characteristics can be obtained in the fuel injection valve 1.

First, the members constituting the magnetic circuit of the fuel injection valve 1 are members that are in contact with fuel such as gasoline, and are exposed to high temperature. However, since the alloy material has high corrosion resistance, the members can be protected from corrosion due to gasoline.

The alloy material exhibits excellent soft magnetic characteristics having high saturation magnetic flux density and high electrical resistance, so that it is possible to suitably correspond to the high pressure injection and the multistage injection of the fuel injection valve 1.

When the pressure of the fuel injection in the fuel injection valve 1 is increased, a large force is required to control opening and closing of the fuel injection valve 1. That is, it is necessary to increase a magnetic attraction force between the fixed core body 51 and the movable core body 41. For this reason, a current flowing through the coil 54 is increased to generate a high magnetic field. At this time, if the member constituting the magnetic circuit is made of a material having high saturation magnetic flux density, the magnetic flux density does not tend to be saturated and can follow the high magnetic field. In this way, mainly as a result of the alloy material having high saturation magnetic flux density, high pressure injection can be easily achieved in the fuel injection valve 1. For example, it can be applied to an electromagnetic valve used at 30 MPa.

Furthermore, in the case of performing multistage injection by the fuel injection valve 1, in order to efficiently perform the multistage injection, it is necessary to control opening and closing of the needle 30 with high accuracy, and it is required to have high responsiveness. High responsiveness can be achieved in the fuel injection valve 1 by forcing the change of the magnetic flux in the magnetic circuit to follow with high responsiveness with respect to a waveform of a control signal to be input to the coil 54. In the case where the member constituting the magnetic circuit is made of a material having high electrical resistance, eddy current loss becomes small, so that responsiveness of the change in the magnetic flux density with respect to the input signal to the coil 54 becomes high. In this way, mainly as a result of the alloy material having high electrical resistance, multistage injection can be easily performed in the fuel injection valve 1. Furthermore, it is desirable that high responsiveness is obtained even under conditions of high pressure injection as described above. The responsiveness of the fuel injection valve 1 can be evaluated, for example, as rise time (To) or fall time (Tc) of an open/close state of the needle 30 when the opening and closing are controlled by a pulse current. Alternatively, it can be evaluated by a dynamic range defined as a difference between the maximum injection amount and the minimum injection amount of the fuel. Here, the injection amount of the fuel depends on the length of the time during which the fuel injection valve 1 is actually opened, and the dynamic range can be increased as the responsiveness of the fuel injection valve 1 is high.

In the fuel injection valve 1, performing high pressure injection and multistage injection can contribute to a reduction in a $CO_2$ emission amount and energy saving in the engine, improvement in fuel efficiency of the vehicle, and the like.

EXAMPLES

Hereinafter, the present invention will be described more specifically by using Examples.
[Evaluation of Characteristics of Alloy Material]
<Preparation of Sample>

Alloy materials having component compositions (unit: mass %) shown in Table 1 were produced as samples of Example 1 and 2 and Comparative Examples 1 to 5, respectively. In any component composition, the balance is Fe and inevitable impurities. As a specific production method, metal materials having the respective composition ratio were melted in a vacuum induction furnace, cast, and hot forged. Then, measurement test pieces obtained by being processed into shapes used in the following tests were subjected to magnetic annealing at 850° C. for 2 hours in a vacuum.

<Measurement of Magnetic Flux Density>

Each alloy material was processed into a cylindrical shape having an outer diameter of ø 28 mm, an inner diameter of ø 20 mm, and a thickness of t 3 mm, and was used as a magnetic ring (iron core). By using this magnetic ring, a primary coil (480 turns) and a secondary coil (20 turns) were formed and used as measurement samples. A magnetic flux density was measured by using a magnetic measuring instrument ("BH-1000" manufactured by Denshijiki Industry Co., Ltd.). The measurement of the magnetic flux density was performed by flowing a current through the primary coil to generate a magnetic field H in the magnetic ring, and calculating the magnetic flux density generated in the magnetic ring based on an integrated value of a voltage induced in the secondary coil. In the measurement, the magnetic field H was set to 30,000 A/m, and B30000, which is a value of the magnetic flux density at that time, was recorded.

<Measurement of Electrical Resistivity>

Each alloy material was processed into a prism shape having a cross section of a 10 mm square and a length of 30 mm, and an electrical resistivity was measured. The measurement was performed by a four-terminal method.

<Evaluation of Corrosion Resistance>

The corrosion resistance to gasoline was evaluated on each alloy material. Specifically, each alloy material was immersed in a gasoline composition at 80° C. over 336 hours. Thereafter, a surface of the alloy material was visually observed to evaluate a degree of corrosion. As evaluation criteria for a sample of each alloy material (ø 50 mm×t 20 mm), a case where an area rate of a discolored portion due to generation of rust was 50% or less was rated as "good", and a case where an area rate of a discolored portion was larger than 50% was rated as "poor".

<Evaluation of Structure of Alloy Material>

A structure of each alloy material after magnetic annealing was observed by using an optical microscope and a scanning electron microscope, and a state of the structure was evaluated.

[Evaluation of Characteristics in Fuel Injection Valve]

<Production of Fuel Injection Valve>

A fuel injection valve for a gasoline engine was produced by using the alloy materials of Example 2 and Comparative Example 5 prepared above. At this time, the structure of the entire fuel injection valve employed is that illustrated in FIG. 1, and the first cylinder portion, the movable core body, and the third cylinder portion, the inlet portion and the fixed core body integrally formed with each other were formed by using the above-mentioned alloy materials.

<Magnetic Field Analysis>

Magnetic field analysis was performed on the injection valves using the alloy materials of Example 2 and Comparative Example 5, respectively, and a time change of an attraction force generated when the same current pattern was applied was analyzed.

[Evaluation Results]

Table 1 shows component compositions and results of evaluating characteristics of the alloy materials of Examples 1 and 2 and Comparative Examples 1 to 5. The component composition of Comparative Example 5 is similar to the component composition disclosed in Patent Literature 1.

TABLE 1

| | Component composition [mass %] | | | | | Characteristics of alloy material | | | |
| --- | --- | --- | --- | --- | --- | --- | --- | --- | --- |
| | | | | | | Magnetic flux density | Electrical resistivity | Corrosion | |
| | Ni | Al | Cr | Mo | Pb | B30000 [T] | ρ [μΩ·cm] | resistance | Structure |
| Example 1 | 0.4 | 1.0 | 9.2 | 1.6 | — | 1.8 | 69 | good | α phase single phase |
| Example 2 | 0.4 | 1.0 | 9.2 | 1.6 | 0.07 | 1.8 | 69 | good | α phase single phase |
| Comparative Example 1 | 3.0 | 1.0 | 9.2 | 1.6 | — | 1.7 | 69 | good | α phase single phase |
| Comparative Example 2 | 0.4 | 1.0 | 13.0 | 1.6 | — | 1.7 | 81 | good | α phase single phase |
| Comparative Example 3 | 0.4 | 1.0 | 5.0 | 1.6 | — | 1.9 | 55 | poor | α phase single phase |
| Comparative Example 4 | 0.4 | 0.5 | 9.2 | 1.6 | — | 1.8 | 60 | good | α phase + γ phase |
| Comparative Example 5 | — | 0.6 | 13.0 | — | 0.07 | 1.7 | 66 | good | α phase single phase |

The alloy materials of Examples 1 and 2 have a high magnetic flux density of B30000≥1.8 T and a high electrical resistivity of ρ≥65 μΩ·cm, corresponding to having the component composition defined in the embodiment of the present invention. The crystal structure is an α phase single phase. On the other hand, the alloy materials of Comparative Examples do not have at least one of a magnetic flux density of B30000≥1.8 T and an electrical resistivity of ρ≥65 μΩ·cm, corresponding to deviating from the component composition defined in the embodiment of the present invention. Furthermore, in Comparative Example 3, since the content of Cr is small, the corrosion resistance decreases. In Comparative Example 4, since the content of Al is small, a mixed phase of α phase and γ phase is formed in the crystal structure instead of the α phase single phase.

Furthermore, FIG. 2 shows results of magnetic field analysis. It can be found that the case of using the material of Example 2 has a shorter time until a required attraction force is reached as compared to the case of using the material of Comparative Example 5. For example, when compared with time until the attraction force reaches 30 MPa is compared, the case of Example 2 (time t1) is 17% shorter than the case of Comparative Example 5 (time t2). In this way, in the case where the electromagnetic valve is formed by using the alloy material of the embodiment of the present invention, as described above, the attraction force and responsiveness of the electromagnetic valve can be improved corresponding to having high saturation magnetic flux density and high electrical resistivity. Alternatively, when there is a margin in the attraction force or the responsiveness, energy consumption can be reduced by reducing a current to be applied.

The embodiment of the present invention has been described above. The present invention is not particularly limited to the embodiment, and various changes can be performed.

INDUSTRIAL APPLICABILITY

The electromagnetic valve of the present invention has high saturation magnetic flux density and electrical resistance in addition to high corrosion resistance. As a result, in the electromagnetic valve, high pressure injection owing to a high magnetic attraction force and multistage injection owing to improvement in responsiveness are facilitated.

Although the present invention has been described in detail by referring to specific embodiments, it will be apparent to those skilled in the art that various modifications and variations are possible without departing from the spirit and scope of the present invention.

This application is based on Japanese Patent Application (No. 2017-245999) filed on Dec. 22, 2017, the contents of which are incorporated herein by reference.

REFERENCE SIGN LIST

1 Fuel injection valve
10 Nozzle
11 Nozzle cylinder portion
12 Nozzle bottom portion
14 Valve seat
20 Housing
21 First cylinder portion
22 Second cylinder portion
23 Third cylinder portion
24 Inlet portion
30 Needle
31 Needle body
32 Seal portion
40 Movable core
41 Movable core body
50 Fixed core
53, 55 Spring
54 Coil

The invention claimed is:

1. An electromagnetic valve used in a fuel system, comprising a member constituting a magnetic circuit in an electromagnetic drive unit,
   wherein at least a part of the member is made of an alloy material comprising, in mass %,
   $0.15\% \leq Ni \leq 0.45\%$,
   $0.65\% \leq Al \leq 1.0\%$,
   $9.2\% \leq Cr \leq 10.3\%$, and
   $0.90\% \leq Mo \leq 1.6\%$
   with the balance being Fe and inevitable impurities.

2. The electromagnetic valve according to claim 1, which comprises a fuel injection valve.

3. The electromagnetic valve according to claim 1, wherein the alloy material further comprises $0.05\% \leq Pb \leq 0.15\%$ in mass %.

4. The electromagnetic valve according to claim 2, wherein the alloy material further comprises $0.05\% \leq Pb \leq 0.15\%$ in mass %.

5. The electromagnetic valve according to claim 1, wherein the alloy material has a structure of an α phase single phase.

6. The electromagnetic valve according to claim 2, wherein the alloy material has a structure of an α phase single phase.

7. The electromagnetic valve according to claim 3, wherein the alloy material has a structure of an α phase single phase.

8. The electromagnetic valve according to claim 4, wherein the alloy material has a structure of an α phase single phase.

* * * * *